US008239954B2

(12) United States Patent
Wobber et al.

(10) Patent No.: US 8,239,954 B2
(45) Date of Patent: Aug. 7, 2012

(54) ACCESS CONTROL BASED ON PROGRAM PROPERTIES

(75) Inventors: Edward P. Wobber, Menlo Park, CA (US); Andrew Birrell, Los Altos, CA (US); Martin Abadi, Palo Alto, CA (US)

(73) Assignee: Microsoft Corporation, Redmond, WA (US)

(*) Notice: Subject to any disclaimer, the term of this patent is extended or adjusted under 35 U.S.C. 154(b) by 1254 days.

(21) Appl. No.: 11/745,048

(22) Filed: May 7, 2007

(65) Prior Publication Data

US 2008/0282354 A1    Nov. 13, 2008

(51) Int. Cl.
    H04L 29/06    (2006.01)
(52) U.S. Cl. .......................... 726/26; 726/4
(58) Field of Classification Search ............ 726/26, 726/4
    See application file for complete search history.

(56) References Cited

U.S. PATENT DOCUMENTS

| | | | |
|---|---|---|---|
| 5,173,939 A | 12/1992 | Abadi et al. | |
| 5,649,099 A | 7/1997 | Theimer et al. | |
| 6,446,069 B1 | 9/2002 | Yaung et al. | |
| 6,986,061 B1 | 1/2006 | Kunzinger | |
| 7,167,918 B2 | 1/2007 | Byrne et al. | |
| 2002/0099952 A1* | 7/2002 | Lambert et al. | 713/200 |
| 2003/0204751 A1 | 10/2003 | Jindani et al. | |
| 2005/0091535 A1* | 4/2005 | Kavalam et al. | 713/201 |
| 2005/0160263 A1* | 7/2005 | Naizhen et al. | 713/167 |
| 2005/0262132 A1 | 11/2005 | Morita et al. | |
| 2006/0206925 A1 | 9/2006 | Dillaway et al. | |
| 2006/0265754 A1 | 11/2006 | Birrell et al. | |
| 2006/0265759 A1 | 11/2006 | Birrell et al. | |

OTHER PUBLICATIONS

Blaze et al., "The Role of Trust Management in Distributed Systems Security", In Secure Internet Programming: Issues in Distributed and Mobile Object Systems, Springer-Verlag Lecture Notes in Computer Science State-of-the-Art series, pp. 185-210, Berlin 1999, http://www.cse.buffalo.edu/~hungngo/classes/2005/620/reading-materials/BFIK-SIP.pdf.

Karjoth, Gunter, Access Control with IBM Tivoli Access Manager, ACM Transactions on Information and System Security (TISSEC), vol. 6, Issue 2, May 2003, pp. 232-257, http://delivery.acm.org/10.1145/770000/762479/p232-karjoth.pdf?key1=762479&key2=3950500711&coll=GUIDE&dl=GUIDE&CFID=12938364&CFTOKEN=59411256.

Theimer, et al, "Delegation Through Access Control Programs", Distributed Computing Systems, 1992., Proceedings of the 12th International Conference on Jun. 9-12, 1992 in Japan, pp. 529-536, http://ieeexplore.ieee.org/iel2/419/6052/00235000.pdf?isNumber=.

Wobber, et al., "Authorizing Applications in Singularity", EuroSys'07, Mar. 21-23, 2007, Lisboa, Portugal, http://research.microsoft.com/users/wobber/EuroSys-SingSec-Final.pdf.

* cited by examiner

*Primary Examiner* — Farid Homayounmehr
*Assistant Examiner* — Thong Truong
(74) *Attorney, Agent, or Firm* — Vierra Magen Marcus & DeNiro LLP

(57) ABSTRACT

A pattern matching access control system determines whether a principal should be granted access to use a resource based on properties of applications comprised by the principal. The principal name may be created when an application is loaded, invokes other applications (or programs) and/or assumes a new role context. Access is provided based on whether, for each application, the publisher is authorized by system policy to grant privilege as requested by the application. When a resource which requires the privilege is requested by a principal, an access control list (ACL) for the resource is expanded with a list of applications that have been authorized through their publisher to assert the privilege. The expanded ACL is compared to the principal name to determine resource access.

20 Claims, 10 Drawing Sheets

Principal Names
firstApp[@user] + middleApps + lastApp login@Ted + word

Figure 4A

Access Control Patterns
login @ted + foo

{$trusted-auth}@Ted (+!.microsoft.com)* login@ted (+{$trusted-apps})*

Figure 4B

| Subexpression | Mapped content |
|---|---|
| $user | {$auth-privilege}@! |
| $app | !|{user} |
| $trusted-auth | login|sshd |

Figure 4C

ACCESS CONTROL BASED ON PROGRAM PROPERTIES

BACKGROUND

Access control is important to providing secure computing. In general, access control involves determining whether to permit a requesting principal to access a resource. A principal may be any entity which requests access. A resource may be anything that can be accessed from a computer, such as data, a database, objects, hardware, programs and so forth. Access to the resource may be restricted in various ways so that some principals are granted only limited access.

Traditional access control systems have several disadvantages. The notion that a principal is identified solely with a logged-in user does not allow for expression of important real-world security situations. For example, a human user is not really an entity making an access request. Rather, the request is being made by a program. Further, most existing access control designs assume that every program executing during a user's session is acting on the user's behalf and with the user's full trust. This is not always true.

Other limitations of previous access control systems involve a single type of logged-in user. These previous systems provide access as all or nothing, and imply that all mechanisms for authenticating a user are equally trusted. They may also require that authentication mechanisms be part of a trusted computing base, when there may be various routes for logging into a computer system.

Some previous access control systems provide a pattern matching method for providing access control. An example of such a system is described in U.S. patent application Ser. No. 11/133,806, titled "Systems and Methods for Pattern Matching on Principal Names to Control Access to Computing Resources," filed on May 19, 2005, having inventors Andrew Birrell, Edward Wobber, and Martin Abadi. Though these pattern matching access control systems overcome some disadvantages of the prior art, they have several disadvantages as well. In particular, the patterns are usually hard coded into a program. Thus, users typically cannot change the access control patterns or must use different access control patterns for each and every resource. Additionally, it can be difficult to ascertain what a program is or is not authorized to do. An improved access control system would be desirable for providing a secure computing system.

SUMMARY

The present technology, roughly described, includes a pattern matching access control system used to determine whether a principal should be granted access to a resource based on program properties of the principal, such as the principal's publisher. Access is determined by comparing an access control list (ACL) associated with the resource to a principal name for a requesting principal. A principal name may be created when an application is loaded, invokes other applications (or programs) and/or assumes a new role context. In some embodiments, an ACL may be an access control pattern against which a principal name is matched to determine whether a principal may access a resource associated with the pattern. An access control pattern may include a sub-expression related to a privilege, mapped content, or a file path node. The sub-expression is expanded into a disjunction of operands to provide a complete access control pattern. After the expansion, a principal name is then matched against the access control pattern to determine resource access.

An access control pattern may be comprised of one or more terms, separated by a symbol such as a "+." In some embodiments, a term in an access control pattern may include a sub-expression, such as a privilege. When matching a principal name and an access control pattern, the privilege may first be expanded. A privilege sub-expression is expanded into a disjunction of one or more operands within the access control pattern. Each operand may indicate an "application name" comprising the publisher-specific name of the application and the application publisher. When a string such as an application name is matched against a disjunction, an overall match is confirmed if the string matches one of the elements of the disjunction.

In some embodiments, determining access to a resource using an access control pattern which includes a privilege sub-expression is performed in two steps. First, upon loading an application, an application manifest within the application is checked to determine if the application claims to assert any privileges. An application manifest is a portion of an application that describes the application, including application properties, asserted privileges, and other application data. For each privilege the application asserts to have, the publisher of the loaded application is matched against an access control pattern for the privilege. In some embodiments, system policy provides an access control pattern (maintained by the system as part of system policy) for each privilege which describes all publishers allowed to grant the privilege. If the application publisher matches the privilege access control pattern, the application is added to an application list for the privilege. When the application later attempts to access a resource which requires the privilege, the resource access control pattern will be expanded using the list of applications for the privilege. If the application is granted the privilege, then the fragment of the overall access control pattern corresponding to the privilege will expand to a disjunction including the application; the disjunction will then match the application name.

An embodiment performs a process that first determines that an application asserts at least one privilege. The publisher of the application is then determined and an access control list for the privilege is accessed. The application publisher is compared to the access control list for the privilege. The application may be added to an application list for the privilege based on the comparison results.

One embodiment receives a request for a resource from a principal associated with a requesting application. An access control pattern associated with the resource is then retrieved, and a privilege sub-expression is identified in the access control list. The privilege sub-expression is expanded within the access control list using a list of application names. The expanded access control list is then compared to the principal name. A determination is then made as to whether to grant use of the resource to the requesting principal based on said step of comparing.

One embodiment includes an apparatus comprised of a communication interface, and a storage device in communication with one or more processors. The storage device may include one or more access control lists, one or more application lists and access permission logic. The one or more access control lists are associated with a resource and have one or more privilege sub-expressions, each of which are associated with one or more privileges. Each application list is associated with one privilege and lists one or more applications to which a privilege is granted. The access permission logic expands each access control list and compares a multiple term principal name to an expanded access control list.

This summary is provided to introduce a selection of concepts in a simplified form that are further described below in the description. This summary is not intended to identify key features or essential features of the claimed subject matter, nor is it intended to be used as an aid in determining the scope of the claimed subject matter.

BRIEF DESCRIPTION OF THE DRAWINGS

FIG. 4A illustrates examples of principal names.

FIG. 4B illustrates examples of access control patterns.

FIG. 4C illustrates examples of sub-expressions and mapped sub-expression content.

DETAILED DESCRIPTION

Figure 1A:
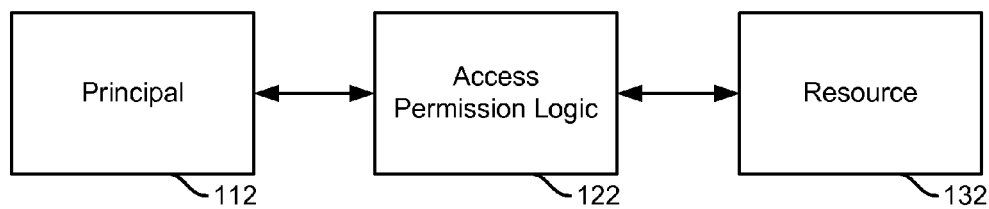
FIG. 1A illustrates a block diagram of an embodiment of an access control system.

A pattern matching access control system is used to determine whether a principal should be granted access to a resource based on properties of a constituent application, such as the application's publisher. In some embodiments, an access control pattern may include a sub-expression related to a privilege, mapped content, or a file path node. The principal name may be a compound string of applications and indicate whether the application was invoked by another application (or programs) and/or assumed a new role context. Access control is determined by comparing the compound principal name string to an access control pattern associated with a requested resource.

An access control pattern is an access control list (ACL) and may be associated with a resource, a privilege or some other element. A principal name of a principal may be matched against an access control pattern associated with a resource that requests access to the resource. A principal name may be comprised of one or more application names, wherein each application name comprised the name of the application and the publisher of the application. This is discussed in more detail below. If the principal name matches the access control pattern, the principal may be granted access to the resource associated with the pattern.

A principal name may be matched against an access control pattern which includes a privilege sub-expression to determine if the requesting principal is authorized to assert the privilege required by the pattern. A privilege may be associated with a list of applications that are authorized to assert the privilege. The list of applications may be generated by system policy and can be updated as new applications are loaded. When a principal name is matched against an access control pattern with a privilege, the privilege sub-expression in the pattern is expanded into a disjunction of operands based on the application list, wherein each operand indicates an application name. The principal name is then matched against the access control pattern after the sub-expression has been expanded. Matching access control patterns and principal names is discussed in more detail below.

Privileges and other program properties may be included in a portion of an application called a manifest. A manifest is a set of information which describes a principal application, including program properties of the application itself. Program properties may include metadata that describes code assemblies, the publisher name, publisher designated application name, privileges associated with the program, and other data. Manifests are usually written into a program by the program publisher that creates or distributes the program. Examples of program publishers include "Microsoft.com", "Adobe.com" and other companies. Manifests may be included in a program in XML or some other format.

A privilege is a feature or an asserted right of a particular application. In some embodiments, one or more privileges are listed in a program manifest as an assertion of a right to perform an action, a feature of the program, or some other asserted right or ability. For example, a privilege may be a right to authorize a user, a right to create a file, a right to access a database, or some other asserted right.

Privilege assertions in manifests may come in several forms. In one embodiment, a privilege may be derived from annotations manually inserted into the application source code. In some embodiments, a privilege assertion for an application may be determined from an analysis of the application source code, for example through static analysis of what resources an application needs to access.

In some embodiments, the matching of application names and access control patterns could be implemented using groups rather than privileges. Pattern matching can then be considered a case of realizing groups. In some embodiments, access control patterns and privilege sub-expression can be restricted so as to contain only disjunctions of application names. In effect, this would allow access control lists to represent groups of specific applications rather than generalized patterns.

Embodiments which utilize groups could utilize the same basic framework, but regular expressions patterns (such as "*" and "!") would not be used in the grammar representing the group which is used for determining access control pattern matching; such expressions would be disallowed for the group expression. Rather than pattern matching, the system would compare each disjunction element in an ACL and require an exact match of one such element. Additionally, the system may assume that principals are not compound entities. Such a system could still have privileges which would expand to disjunction as before, and one of the elements would have to match as above. Thus, the system would provide runtime-determined, publisher-specific group membership (derived from program manifests). Comparing a principal name to an access control pattern having a group is discussed in more detail below with respect to FIG. 9.

Determining access to a resource which requires a requesting principal have a privilege is handled in two steps. First, a determination is made as to whether to add an application to an application list. Adding an application to an application list may be done in several ways. In some embodiments, the application may be added when the application is loaded. Upon loading an application, the application manifest is checked to determine if the application claims to assert any privileges. For each privilege the application asserts to have, the publisher of the loaded application is matched against an access control pattern for the privilege. In some embodiments, system policy provides an access control pattern (maintained by the system as part of system policy) for each privilege which describes all publishers allowed to grant the privilege. If the application publisher is a match for the privilege access control pattern, the application is added to an application list for the privilege. If the application publisher does not match the privilege access control pattern, the application is not added to the application list for the privilege. In some embodiments, the determination as to whether to add an application to an application list may be made when the application is installed. Potentially adding applications to application lists at application install time may result in a larger application list than one created when applications are running, but may still be desired in some environments. In some embodiments, applications may be removed from an application list if the application no longer appears on any compound principal chain.

In the second step, when the application later attempts to access a resource which requires the privilege (as defined by the resource access control pattern which includes the privilege as a sub-expression), a resource access control pattern is expanded using the list of applications for the privilege. If the application is not on the application list associated with the privilege, the application (principal) will not match the access control pattern associated with the resource that requires the privilege. Only those applications which have publishers in the privilege access control pattern will be allowed to access resources which require the privilege.

In some embodiments, the maintenance of a privilege application list can be done in several ways. For example, the list can be constructed when applications are installed. Additionally, applications can be added to privilege lists when an application is loaded, and removed when the applications no longer appear on any compound principal chain. In the latter example, application lists are much shorter than they would be than if they were constructed only at install time.

FIG. 1A illustrates a block diagram of an embodiment of a basic access control system. FIG. 1A includes principal 112, access permission logic 122 and resource 132. Access permission logic 122 may receive a request from a principal 112 to access resource 132. The access may be one of several types of access, including retrieving a file from resource 132, utilizing services of resource 132, or some other access of resource 132. Access permission logic 122 determines if principal 112 is authorized to use resource 132.

Figure 1B:
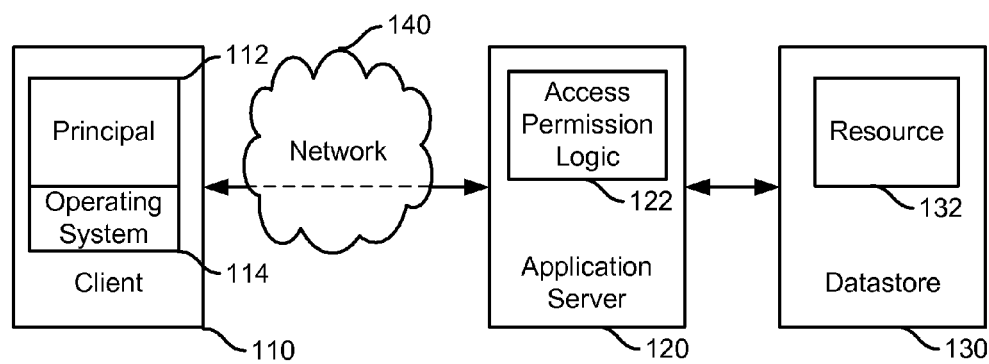
FIG. 1B illustrates a block diagram of an embodiment of an access control system provided over a network.

FIG. 1B illustrates a block diagram of an embodiment of an access control system provided over a network. FIG. 1B provides one embodiment in which the system of FIG. 1A may be implemented. In particular, principal 112 may be implemented on client 110, access permission logic 122 may be implemented on application server 120 and resource 132 may be implemented on data store 130. Principal 112 may be a program, application or some other process which runs on operating system 114 of client 110. Principal 112 may request access to resource 132 through application server 120 over network 140. Thus, as illustrated, principal 112 may remotely access 132 over network 140. Network 140 may be implemented as the Internet or other WAN, a LAN, intranet, extranet, private network or other network or networks.

Figure 2A:
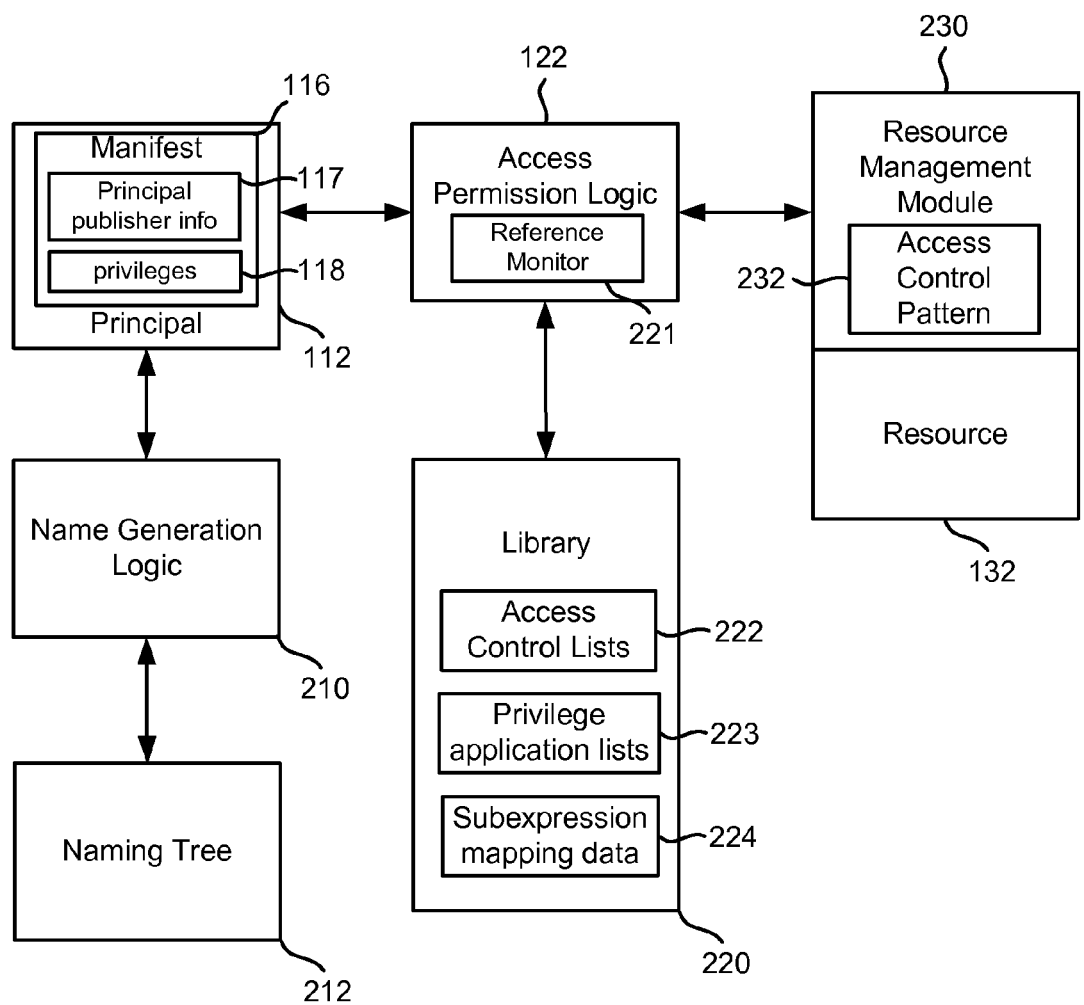
FIG. 2A illustrates a block diagram of an embodiment of an access control system utilizing pattern matching involving sub-expressions.

FIG. 2A illustrates a block diagram of an embodiment of an access control system utilizing pattern matching. The block diagram of FIG. 2A includes principal 112, access permission logic 122, resource 132, name generation logic 210, naming tree 212, library 220 and resource management module 230.

Principal 112 is a program which may or may not be associated with a user. The access program may be allowed to use a resource based on a principal name generated for the principal. A principal name may be comprised of a string constructed from publisher names, the executing program requesting access, program execution history, a user log-in mechanism or a role. A principal name is compared to an access control pattern for a resource to secure access for the resource.

Principal 112 includes manifest 116. As discussed above, a manifest may describe an application and be inserted into or associated with an application by the application publisher. Manifest 116 may include one or more privileges 117 and principal publisher information 118, among other data. Principal publisher information 118 may identify the publisher associated with principal 112. Privilege 117 may include one or more privileges that principal 112 asserts it has the right to perform on a resource, such as resource 132.

A principal name may be generated by name generation logic 210 for an entity which may request a resource. A principal name may be publisher-specific and generated as an Internet-style publisher name, from a naming tree, or in some other manner. An Internet-style publisher name can be certified by some outside authority (such as Verisign) to correspond to some well-known name in the DNS namespace (for example, microsoft.com). In naming trees, each local node decides its own naming hierarchy, and places the publisher at an appropriate place in that hierarchy.

Both naming-tree and Internet-style publisher names, whether derived from the locally-defined or outside-authority-defined namespace, are concatenated with the publisher-specified name (the name of the application) to create an "application name" for the purpose of naming principal elements. The principal naming function can be integrated into the core logic of an operating system responsible for launching applications and providing them with the resources they request. In this case, the logic that invokes an application may also supply a principal name for the application. In some embodiments, the invoking and naming of applications can be independent of the operating system.

In some embodiments, a principal name presented to a reference monitor may include the executing program. The executing program may be invoked by a user or invoked by another program. The principal name can also include execution history information by indicating a path of program invocations. Specifying program execution history information in a principal name allows for finer grain access control decisions. For example, it may be desirable that file write access be granted only to a user when running a specific program or that a script interpreter only be granted certain rights when invoked by a known trusted program.

In some embodiments, a principal name may indicate a role context assumed by an application. For example, a principal name may include user login information. A principal may arise from a console login, remote terminal login, creation of a background service, batch job or daemon, or some other process. Authentication might be by password, X.509 certificate, smart card, an ad hoc decision by an application, or by some other authentication technique. These various login mechanisms provide varying degrees of security and can be included as part of the principal name presented to reference monitor 221. A user may log in as an administrator with many access privileges, or in some other capacity ("employee," "guest," "engineer," "manager," and so forth) that may be entitled to some limited set of access privileges. The role can reflect the appropriate set of access privileges. This and other examples of principal names are discussed in more detail below.

Access permission logic 122 may include reference monitor 221. Reference monitor 221 may act as a pattern comparison engine to compare an access control pattern associated with resource 132 with the name of principal 112. In determining whether a principal 112 should be granted access for a requested use of resource 132, reference monitor 221 may access library 220. Library 220 includes access control lists 222, privilege application lists 223 and sub-expression mapping data 224. In some embodiments, access control lists may include lists of entities that have access to a particular resource or other object. One type of access control list includes a list of publishers that are authorized to grant a particular privilege to an application. Thus for each privilege, there may be an access control list which includes a list of publishers.

Privilege application lists 223 are lists of applications which may assert one or more privileges. The lists may be generated by a system according to system policy, by access permission logic 122, or some other module. In some embodiments, when an application is loaded, the system may recognize that the application asserts one or more privileges. A determination is then made as to whether the publisher of the application is allowed to grant the privilege to the application. Details of the determination are discussed in more detail below. If the application publisher is allowed to grant the privilege, the application which asserts the privilege is added to the application list for the privilege. Thus, each application list is associated with one privilege and includes a list of applications determined to be able to assert the privilege.

Sub-expression mapping data 224 may include a list of sub-expressions and the corresponding content to be inserted into a control access pattern in place of the sub-expression within the pattern. The mapped data may include another sub-expression, an indication of a user or application required, or some other data. Examples of sub-expressions are discussed with respect to FIG. 4B.

Resource 132 may be managed or controlled by resource management module 230. Resource management module 230 may control resource 132, as well as access to resource 132. Examples of resource management modules include a file system manager for a file resource, a database controller for a database resource, and other managing systems. Resource management module 230 may include access control pattern 232. Access control pattern 232 may be used to determine what principals may be granted access to resource 132. In some embodiments, more than one access control pattern 232 will be associated with resource 132, where each access control pattern 232 is associated with a particular use of resource 132. Thus, if resource 132 is a database, one access control pattern may specify a list of principals that may read data from the database while a second access control pattern may specify a list of principals that may delete data from the database. Examples of access control patterns are discussed below with respect to FIG. 4A.

Figure 2B:
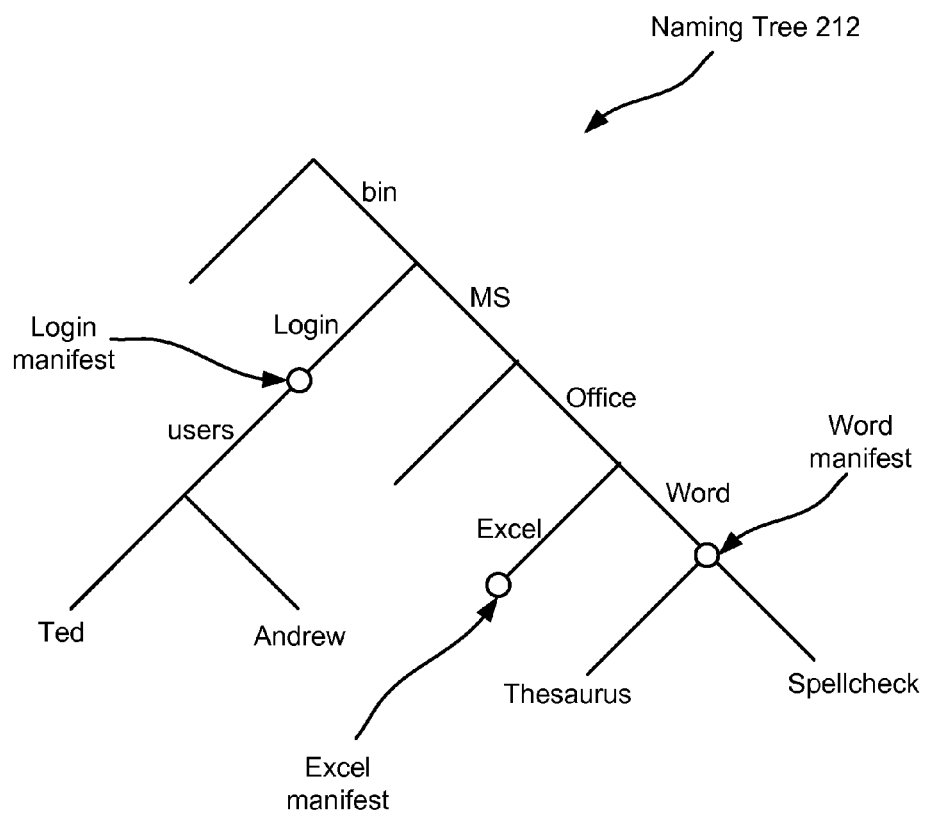
FIG. 2B illustrates an example of a naming tree.

FIG. 2B illustrates an example of a naming tree 212. A naming tree is a hierarchical structure for organizing data which includes a number of nodes. Naming tree 221 may represent all entities in a computer system, trusted entities in a system (entities that are deemed not malicious or otherwise undesirable), programs, users, and roles. The parent node is bin, which includes child nodes of MS and Login. In tree 212, the MS node includes an arbitrary child node and a child node of Office. The Office node includes child nodes of Excel and Word. The Word node has child nodes of Thesaurus and Spellcheck. The Login node has a child node of users, which as child nodes of Ted and Andrew. In some embodiments, cryptographic keys, certificates, and system policy that dictates what entities are trusted and why may be excluded from the naming tree 550 to clearly separate access control and trust policy.

Some of the nodes in naming tree 212 are associated with manifests. In particular, naming tree 212 also includes a Login manifest, an Excel manifest and a Word manifest. Each manifest describes the properties, publisher, meta-data and other information regarding the particular program it is connected to. In naming tree 212, the tree path identifies a manifest-name and implies that the manifest has supplied evidence for why it should be trusted to reside at that point in the naming hierarchy. Generation and use of naming trees is discussed in more detail in U.S. patent application Ser. No. 11/134,760, titled "Systems and Methods for Identifying Principal to Control Access to Computing Resources," filed on May 19, 2005, having inventors Andrew Birrell, Edward Wobber, and Martin Abadi, which is incorporated herein by reference.

Figure 3:
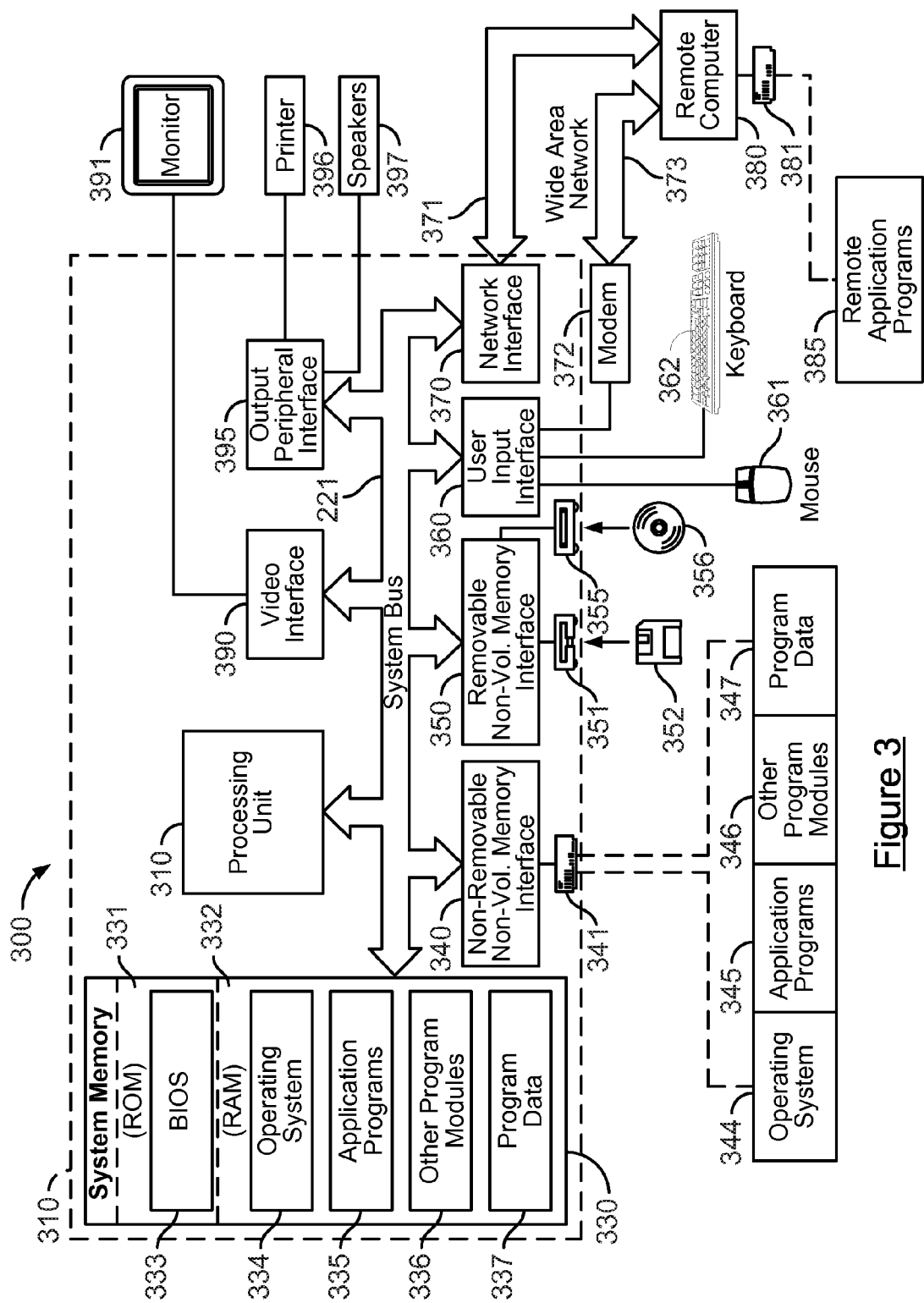
FIG. 3 is an embodiment of a computing environment for implementing the present technology.

FIG. 3 is an embodiment of a computing environment for implementing the present technology. The computing environment of FIG. 3 may provide more detail for client 110, application server 120, data store 130, as well as any system that implements principal 112, access permission logic 122, library 220, resource 132 and resource management logic 230.

Computing environment 300 of FIG. 3 is only one example of a suitable computing environment and is not intended to suggest any limitation as to the scope of use or functionality of the technology herein. Neither should the computing environment 300 be interpreted as having any dependency or requirement relating to any one or combination of components illustrated in the exemplary operating environment 300.

The technology described herein is operational with numerous other general purpose or special purpose computing system environments or configurations. Examples of well known computing systems, environments, and/or configurations that may be suitable for use with the technology herein include, but are not limited to, personal computers, server computers, hand-held or laptop devices, mobile phones or devices, multiprocessor systems, microprocessor-based systems, set top boxes, programmable consumer electronics, network PCs, minicomputers, mainframe computers, distributed computing environments that include any of the above systems or devices, and the like.

The technology herein may be described in the general context of computer-executable instructions, such as program modules, being executed by a computer. Generally, program modules include routines, programs, objects, components, data structures, and so forth that perform particular tasks or implement particular abstract data types. The technology herein may also be practiced in distributed computing environments where tasks are performed by remote processing devices that are linked through a communications network. In a distributed computing environment, program modules may be located in both local and remote computer storage media including memory storage devices.

With reference to FIG. 3, an exemplary system for implementing the technology herein includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 typically includes a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 330 includes computer storage media in the form of volatile and/or nonvolatile memory such as read only memory (ROM) 331 and random access memory (RAM) 332. A basic input/output system (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337.

The computer 310 may also include other removable/non-removable, volatile/nonvolatile computer storage media. By way of example only, FIG. 3 illustrates a hard disk drive 340 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer readable instructions, data structures, program modules and other data for the computer 310. In FIG. 3, for example, hard disk drive 341 is illustrated as storing operating system 344, application programs 345, other program modules 346, and program data 347. Note that these components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 30 through input devices such as a keyboard 362 and pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 390.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 3 illustrates remote application programs 385 as residing on memory device 381. It will be appreciated that the network connections shown are exemplary and other means of establishing a communications link between the computers may be used.

Principal names may be generated by name generation logic 210 as an application is loaded, is invoked by other applications or assumes a new role context. For an example of generating a principal name when a program is invoked, assume a first principal identified by the identifier "A." Principal A invokes an application, for example MICROSOFT WORD, by requesting the invocation to an operating system, or in some other manner. The MICROSOFT WORD application is launched and a new principal name is assigned to the MICROSOFT WORD application. Assuming that MICROSOFT WORD is identified by a string "B," name generation logic 210 may assign the identifier "A+B" to the launched MICROSOFT WORD application. If the MICROSOFT WORD application (principal A+B) then initiates another application, identified by string "C", name generation logic 210 can assign the principal name "A+B+C" to the new application.

To provide an example of generating a principal name when a program assumes a new context role, assume a first principal identified by the name "A." Principal A initiates a new instance of itself in a role which has new security context. Name generation logic 210 can assign the new application a principal name that incorporates the name of the original principal as well as any role associated with the new security context. For example, if the identifier for the new role is "RR," then the principal name "A@RR" can be generated for the new principal. For example, if a principal A is a login process prior to user login, and principal A initiates the login process in a new security context associated with the role of the logged in user, name generation logic 210 may combine the principal name "A" with the new role identifier "RR" to create a new principal name for the new principal, "A@RR."

FIG. 4A includes an example of a principal name general format and a specific example of a principal name. The format example of "firstApp[@user]+middleApps+lastApp" includes three terms separated by the "+" sign. Thus, a term in a principal name describes an application name, and is separated by other application names by a "+" sign. The first term "firstApp[user]" identifies a first principal and indicates that the first application "firstApp" has assumed a role of "user" as indicated by the "@" symbol. The user role is optional, as indicated by the brackets. The principal name may include any number of middle terms associated with applications in an invocation chain which begins with an invocation by the first term application. The first term and any middle terms correspond to program execution history information in the principal name. The last term of "lastApp" represents the most recent application to be invoked, and the current executing application.

The second example principal name in FIG. 4A is "login@Ted+word." In almost all the examples discussed in FIG. 4A, "login" and "word" are shorthand for an application name that also includes a publisher name (for example, word.microsoft.com or word.office.microsoft.com). The first term of "login@Ted" reflects that the process "login" assumed a role of "Ted." The second term of "word" indicates that the application "word" was invoked by the process associated with the first term of "login@Ted."

FIG. 4B illustrates examples of Access Control Patterns. The grammar used for an access control pattern is similar to that for a principal name. The first listed access control pattern example is "login@Ted+foo." Thus, the first term of the pattern requires that the process "login" assumes a role context of "Ted," for example as a result of the user Ted performing a successful login operation using the process "login." The second term requires that the principal "login@Ted" invoke a process called "foo."

The second access control pattern example of "{$trusted-auth}@Ted (+!.microsoft.com)*" also has two terms. The first term of "{$trusted-auth}@Ted" requires that an application assume the role "Ted." The application may be any that is associated with the sub-expression "trusted-auth." In the embodiment illustrated, the string "trusted-auth" is identified as a sub-expression because it is enclosed in brackets "{ ... }." The "$" symbol is used to indicate that the sub-expression can be resolved as either a known sub-expression or a privilege. The sub-expression may be mapped to a list of applications within sub-expression mapping data 224 of library 220 of FIG. 2A.

The second term requires that the principal associated with the first term invoke any application having a publisher of "microsoft.com." The "!" symbol indicates that any application may be named before the publisher name of "microsoft.com." The parenthesis surrounding the second term and the "*" following the second term indicate that a string containing any number of terms will match, as long as each term consists of a '+ operator followed by a string that ends with the specified publisher name.

The third access control pattern example is "login@Ted (+{$trusted-apps})*. The first term requires that an application "login" assume the role "Ted." The second term requires that the principal name, how ever many term it has in addition to the first term (per the "*" symbol), include applications that are mapped to the sub-expression "trusted-apps."

In some embodiments, other grammar types may be used to represent a principal name and access control pattern, such as regular expression grammars. Additionally, other pattern matching mechanisms may be used to match a principal name and access control pattern. The example grammar and matching mechanism discussed herein is not intended to be exclusive, and other types may be used with the present technology discussed herein.

FIG. 4C illustrates three examples of sub-expressions and content mapped to the sub-expression. The mapped content can be substituted for a sub-expression in a control access pattern. The sub-expressions and mapped content may be contained in sub-expression mapping data 224 of library 220. The first example includes a sub-expression of "$user" and mapped content of "{$auth-privilege}@!." When a control access pattern includes a sub-expression of "$user," the sub-expression is expanded into content of "{$auth-privilege}@!" This mapped content is a sub-expression which recites a privilege. Thus, to access the resource, an application must have a privilege of "auth-privilege" properly granted to it and assume any role context, as indicated by the "!" symbol. It is intended that the particular grammar used in the example principal names, access control patterns and sub-expressions are examples, and that other formulations are possible.

The second sub-expression of "$app" is mapped to content of "!|{user}." The mapped content would be satisfied with any application or user, as indicated by the "|" symbol. The third sub-expression of "$trusted-auth" is a privilege which has a corresponding access control pattern of a publisher "microsoft.com." Assuming that the publisher "microsoft.com" has granted the privilege to applications "login" and "sshd," the privilege expands to (login.microsoft.com|sshd.microsoft.com). In this example, the "$trusted-auth" sub-expression may be matched by either "login.microsoft.com" or "sshd.microsoft.com" application names.

Figure 5:
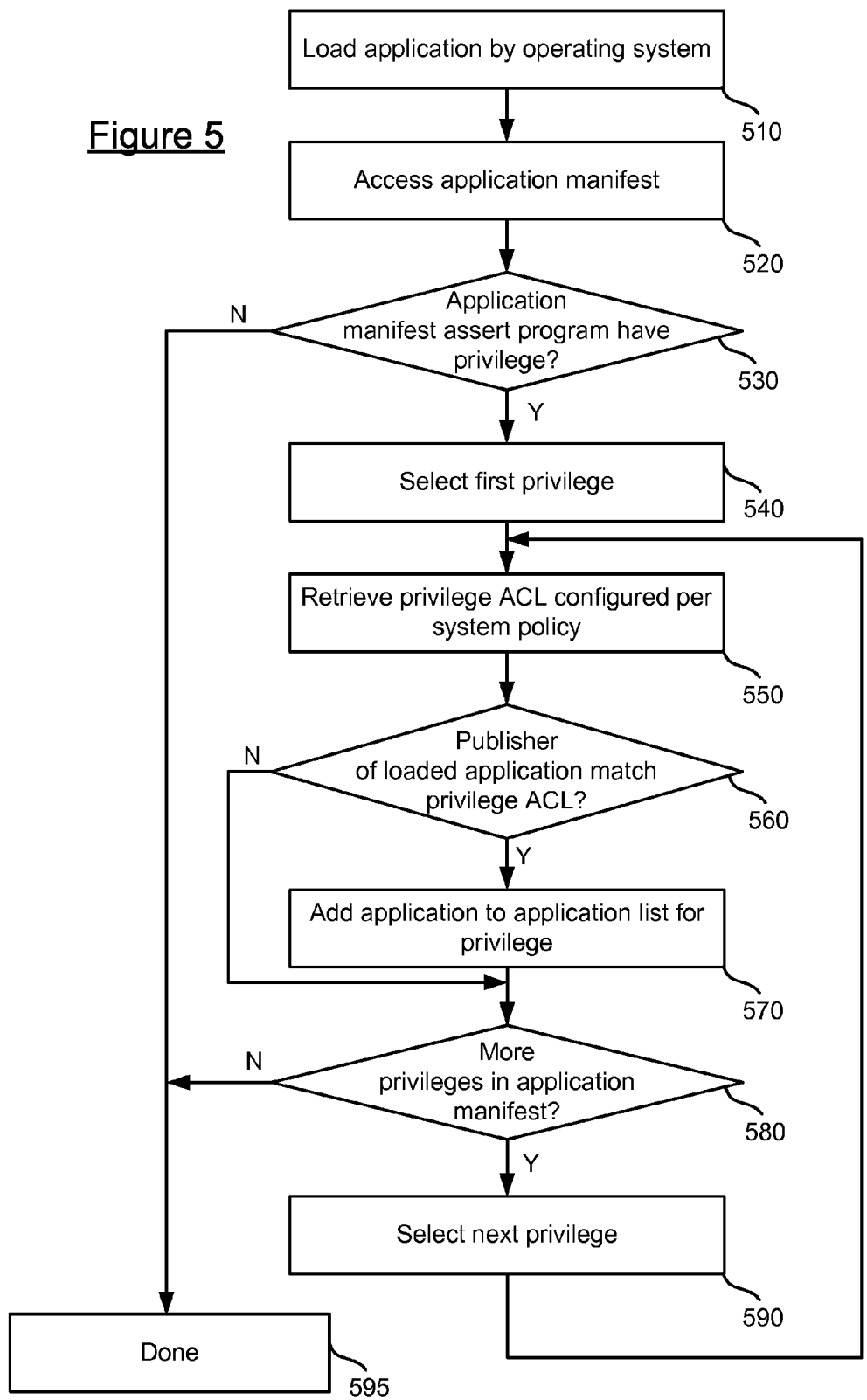
FIG. 5 illustrates a flow chart of an embodiment of a process for determining whether an application may assert a privilege.

FIG. 5 illustrates a flow chart of an embodiment of a process for determining whether an application may assert a privilege. In some embodiments, an access control pattern is configured for each privilege by a system by system policy and can be accessed by access control permission logic 122 as applications are invoked or role contexts are created.

First, an application being invoked is loaded by operating system 114 at step 510. With respect to FIG. 2A, the application may be principal 112. Next, application manifest 116 of the application is accessed at step 520. In some embodiments, operating system 114 may automatically access an application manifest associated with an application. In some embodiments, name generation logic 210, reference monitor 221 or some other module may access manifest 116. As discussed above, the application manifest may include one or more privileges asserted by the application and the publisher of the application.

A determination is then made as to whether application manifest 116 asserts that the application has one or more privileges 118 at step 530. In some embodiments, XML within the application manifest may indicate one or more privileges asserted to be associated with the application. The privileges asserted in the manifest are typically provided by the publisher of the application. For example, for the application "Microsoft Word," the publisher Microsoft.com would indicate any privileges that are purportedly granted to the application. If the application manifest does not assert that the program has any privileges, the method of FIG. 5 is done at step 595.

If the application manifest asserts that the program does have one or more privileges at step 530, the first privilege is selected at step 540. A privilege access control pattern is then retrieved at step 550. The privilege access control pattern may include a list of publishers which are allowed by the system to grant the particular privilege. The privilege access control pattern may not list all publishers that actually try to grant a privilege to an application.

A determination is made at step 560 as to whether the publisher of the loaded application matches the privilege access control pattern. If the publisher of the application loaded at step 510 is not a match for the privilege access control pattern retrieved at step 550, then the publisher of the application is not allowed by the system to grant the privilege. If the application publisher and access control pattern do not match, the process of FIG. 5 continues to step 580. If the application publisher does match the privilege access control pattern, the loaded application is added to an application list of the privilege at step 570. The privilege application list contains a list of applications allowed to assert the particular privilege, and is used to expand a resource access control pattern which includes a privilege sub-expression. After adding the application to the application list at step 570, the process of FIG. 5 continues to step 580.

A determination is made as to whether there are one or more additional privileges in the application manifest for the loaded application at step 580. If one or more additional privileges exist, the next privilege is selected at step 590 and the process of FIG. 5 continues to step 550. If no further privileges are asserted by the loaded application, the process of FIG. 5 ends at step 595.

Figure 6:
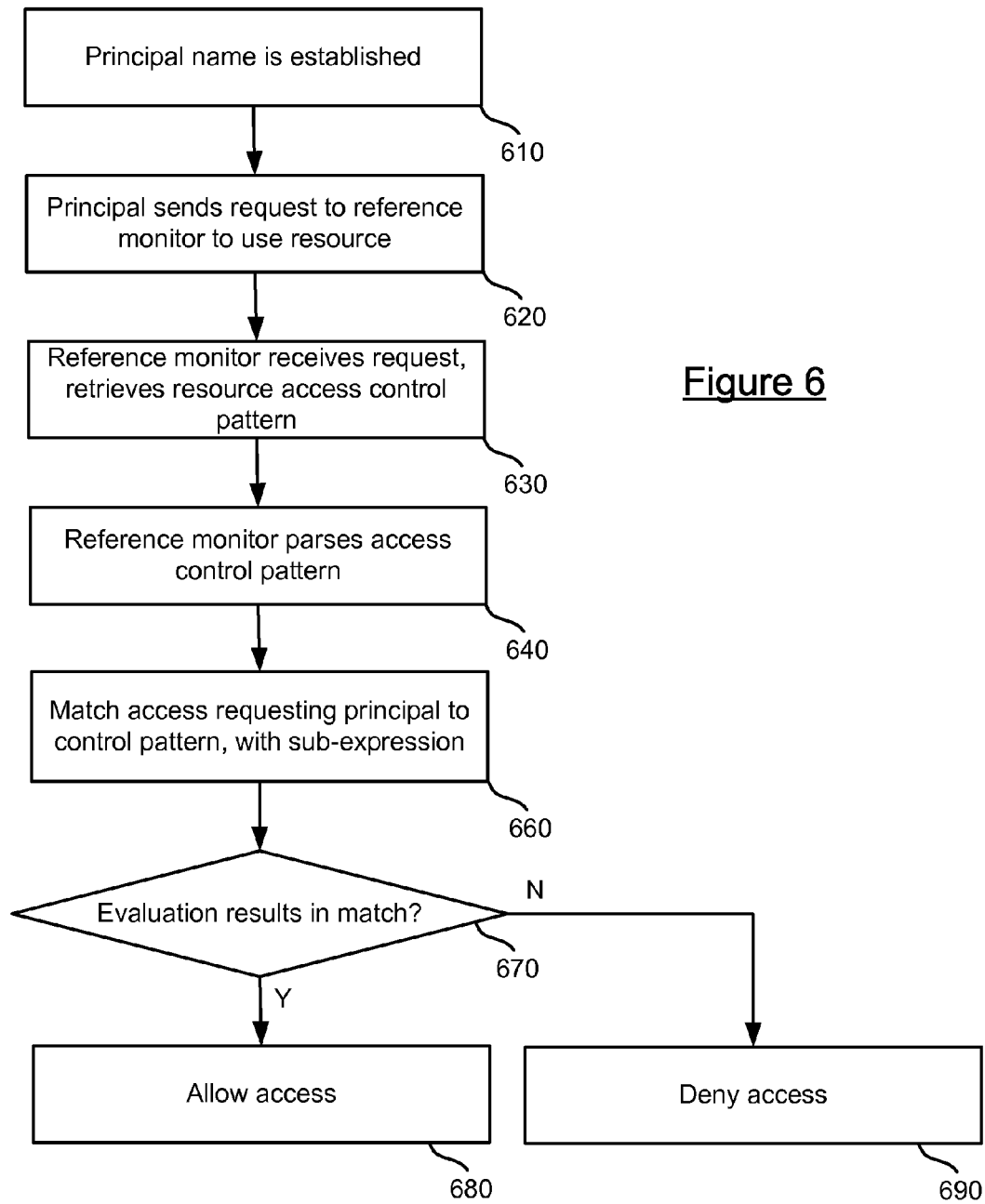
FIG. 6 illustrates a flow chart of an embodiment of a process for determining access to use a resource or a principal.

FIG. 6 illustrates a flow chart of an embodiment of a process for determining access to use a resource for a principal. First, a principal name is established at step 610. As discussed above, a principal name may be generated by name generation logic 210 as existing principals assume a different role context or invoke additional programs. Examples of principal names are discussed above with respect to FIG. 4A. Next, a principal sends a request to reference monitor 221 to use a resource at step 620. In some embodiments, the principal sends a request to an operating system or an application server through which the resource may be accessed. The operating system or application server then direct the request to reference monitor 221.

Reference monitor 221 retrieves a resource access control pattern associated with the requested resource at step 630. With respect to FIG. 2A, reference monitor 221 may retrieve access control pattern 232 by sending a request to resource management module 230. Resource management module 230 receives the request and transmits access control pattern 232 to reference monitor 221 in response to the request. After retrieving the pattern, reference monitor 221 then parses the retrieved access control pattern 232 at step 640. The pattern may be parsed to identify the individual terms that comprise the pattern. In some embodiments, step 640 is optional.

Reference monitor 221 may match requesting principal 112 to the access control pattern, which may include one or more sub-expressions, at step 660. Matching the access control pattern may include fully expanding any sub-expression within the access control pattern and matching the principal against the expanded access control pattern. In some embodiments, some intermediate matching may be performed by comparing the terms of the access control pattern which do not require complete expansion to the principal name of the requesting principal to determine if there is a match. Matching the pattern to the principal name may require reference monitor 221 to retrieve one or more access control lists 222 and sub-expression mapping data 224 of library 220. Matching an access control pattern with sub-expressions for a requesting principal is discussed in more detail below with respect to FIG. 7.

In some embodiments, matching a principal to an access control pattern at step 660 may include evaluating a group within the access control pattern. As discussed above, a group within an access control pattern may be expanded within the access control pattern. The expanded pattern can then be matched against the requesting principal. Expansion of a group within an access control pattern and determining if the principal matches the expanded access control pattern is discussed in more detail below with respect to FIG. 9.

A determination is made as to whether the matching of access control pattern 232 and the principal name results in a match at step 670. The matching of the access control pattern and principal name is performed after the access control pattern has been expanded, for example with respect to any sub-expressions in the access control pattern. A match occurs if the principal name as a whole matches the access control pattern for the requested resource. If the principal name matches the access control pattern, principal may be granted the requested use of resource at step 680. If the access control pattern and principal name do not match, access to resource 132 is denied to principal 112 at step 690.

Figure 7:
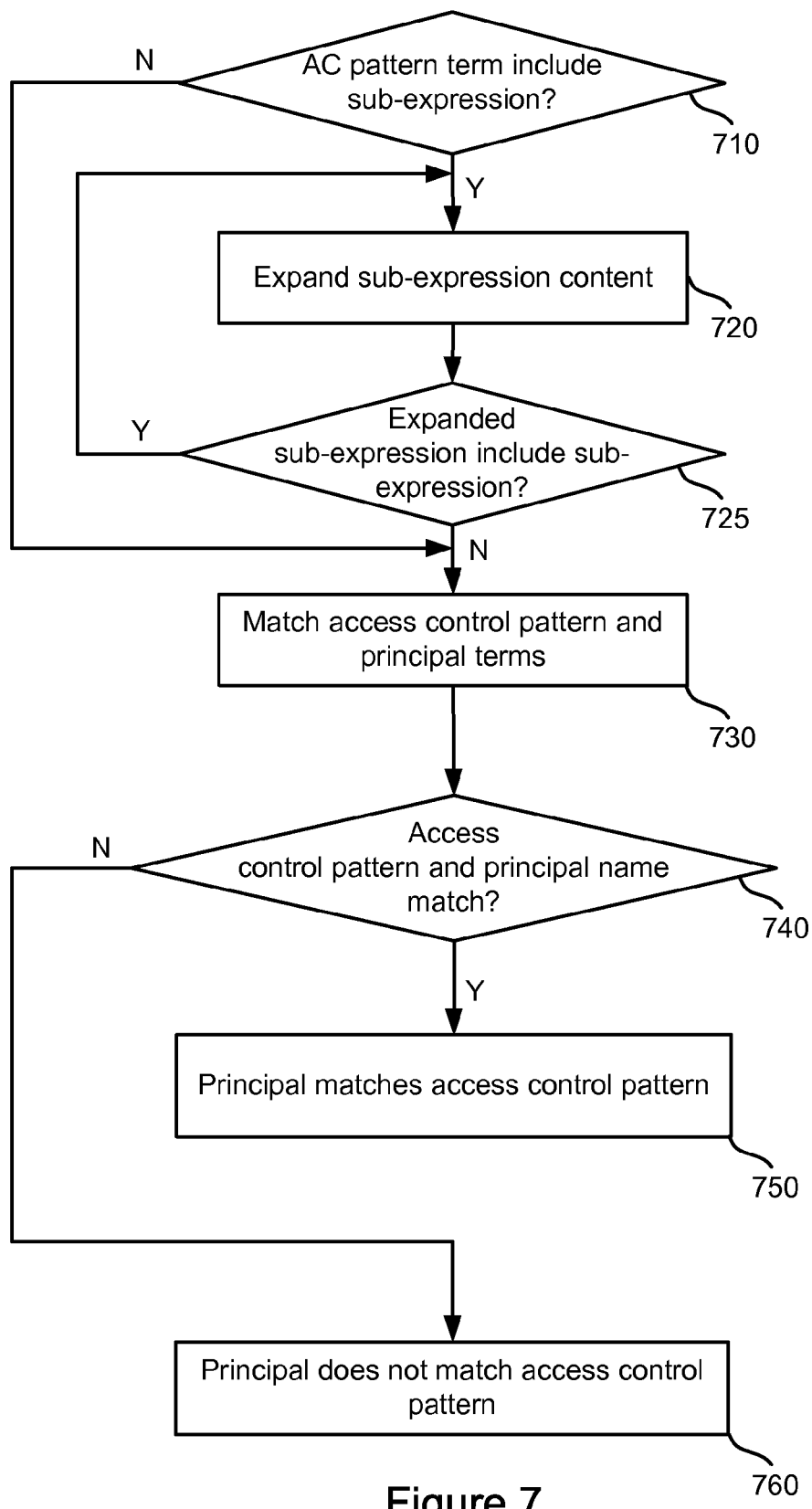
FIG. 7 illustrates a flow chart of an embodiment of a process for comparing an access control pattern to a principal name.

FIG. 7 illustrates a flow chart of an embodiment of a process for comparing an access control pattern to a principal name. In some embodiments, the process of FIG. 7 provides more detail for step 660 of FIG. 6. First, a determination is made as to whether the selected access control pattern includes a sub-expression at step 710. The determination as to whether the access control pattern includes a sub-expression may include determining whether a sub-expression symbol is contained in or encloses a portion of the access control pattern, such as brackets. If the access control pattern includes a sub-expression, the sub-expression is expanded at step 720. Expanding the sub-expression in the access control pattern may include determining whether the sub-expression is associated with a file path, privilege or some other content, and substituting the corresponding the sub-expression content into the access control pattern. Expanding a sub-expression is discussed in more detail below with respect to the process of FIG. 8.

After expanding the sub-expression, a determination is made as to whether the expanded sub-expression includes a sub-expression at step 725. Thus, the system determines whether the content used to expand the sub-expression includes another sub-expression. If the expanded sub-expression includes another sub-expression, the process returns to step 720 wherein the new sub-expression is expanded. If the expanded sub-expression does not contain an embedded sub-expression, the method of FIG. 7 continues to step 730.

In some embodiments, a sub-expression within an access control list may include an embedded sub-expression. Thus, expansion for the access control list may require two iterations. Theoretically, an infinite recursion could be possible, for example when a sub-expression may include a reference to itself. To prevent this, access permission logic 221 may have logic which detects an infinite number or sub-expression expansion and prevents the corresponding access control list from being expanded.

If an access control pattern does not include a sub-expression, the access control pattern and principal name are matched at step 730. Matching of the pattern and principal name may include determining whether the principal name matches a disjunction of operands which comprise the expanded access control pattern. For example, if the access control pattern describes a disjunction of application operands, then the corresponding principal must be one of the applications. If the access control pattern describes an application which assumes a particular context role, then a corresponding principal name must include the application having the particular context role. A principal name must match an expanded access control pattern in its entirety.

A determination is made as to whether the access control pattern and principal name match at step 740. If the access control pattern and principal name do not match, a determination is made that the principal name does not match the access control pattern at step 760. The determination is then used in the process of FIG. 6 to determine whether access is granted to the requesting principal. If the access control pattern and principal name do match, the principal is determined to match the access control pattern at step 750.

Figure 8:
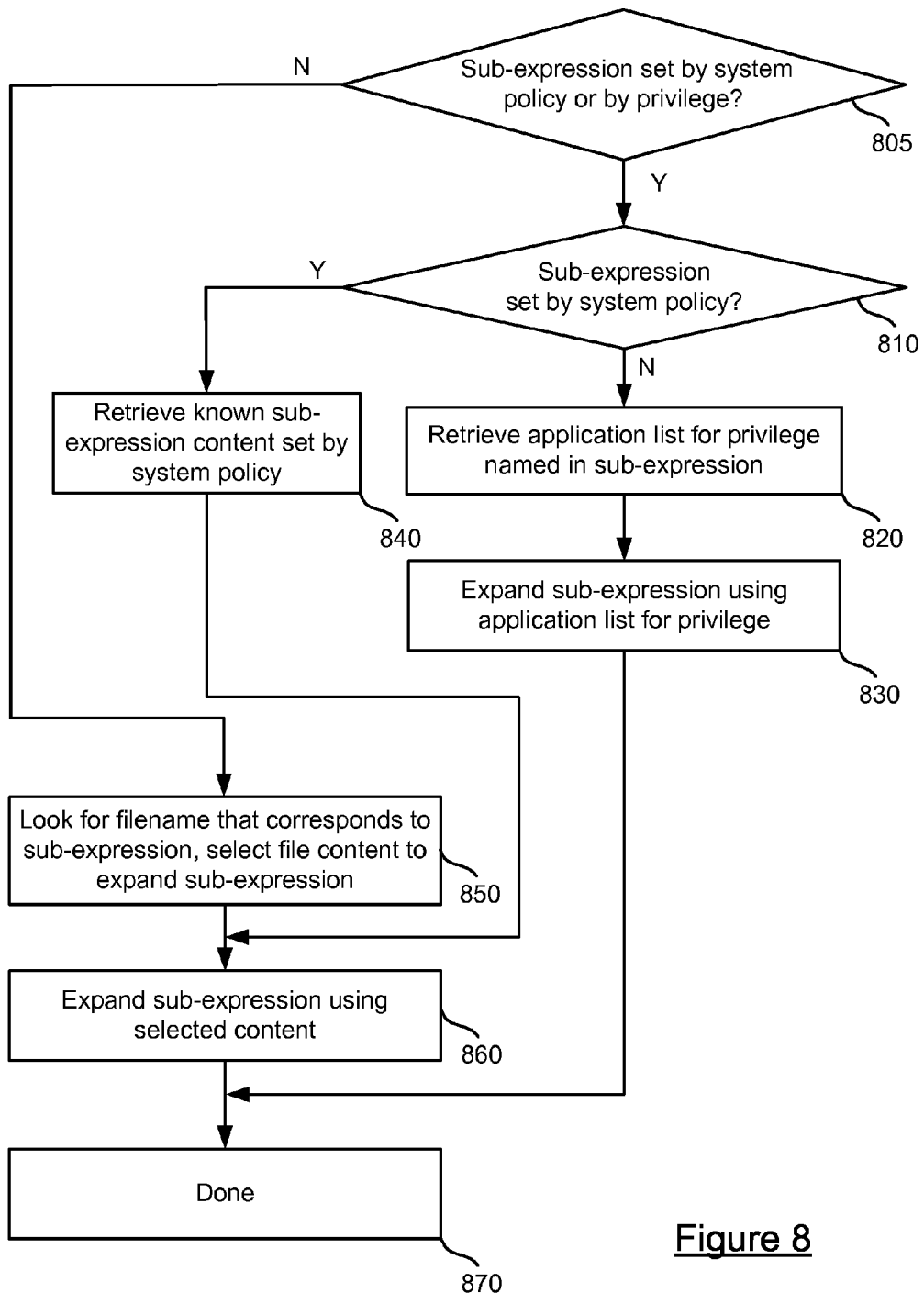
FIG. 8 illustrates a flow chart of an embodiment of a process for evaluating a sub-expression in an access control pattern.

FIG. 8 illustrates a flow chart of an embodiment of a process for evaluating a sub-expression in an access control pattern. In some embodiments, the method of FIG. 8 provides more detail for step 730 of the method of FIG. 7.

First, a determination is made as to whether a symbol is detected which indicates the sub-expression is set by system policy or by privilege at step 805. In some embodiments, the symbol may be a "$" symbol as discussed above with respect to FIG. 4B. The sub-expression mapping data 224 is located in library 220. If the sub-expression does not include a system policy or privilege symbol, the content mapped to the sub-expression is retrieved at step 850. In one embodiment, retrieving the content at step 850 may include comparing the sub-expression to a list or table of sub-expressions and corresponding mapped sub-expression data 224. The sub-expression may be mapped to sub-expression content as discussed above. The process of FIG. 8 then continues to step 860. If the sub-expression does include a system policy or privilege symbol, the process of FIG. 8 continues to step 810.

A determination is made as to whether the detected sub-expression is set by system policy or by privilege at step 810. In some embodiments, an access control pattern may indicate that a sub-expression is set by system policy or is a privilege by preceding the sub-expression with a symbol, such as a "$." In this embodiment, if the "$" symbol is detected in an access control pattern, the sub-expression is either set by system policy or a privilege and the process of FIG. 8 continues to step 810. If the sub-expression is not set by system policy or a privilege, the process continues to step 850.

A filename is retrieved that corresponds to the sub-expression at step 850. In some embodiments, the sub-expression is determined to describe a file path, wherein the file at the end of the file path is to be used to expand the sub-expression. The sub-expression is determined to be associated with a file path because it was determined the sub-expression is not set by system policy or associated with a privilege at step 805. The file content of the file associated with the file path is accessed at step 850 and the process continues to step 860.

A determination is made as to whether the sub-expression is set by system policy at step 810. If the sub-expression is set by system policy, the sub-expression content set by system policy is retrieved at step 840 and the process continues to step 860. If the sub-expression is not set by system policy, then the process continues to step 820.

The sub-expression is expanded using the selected content at step 860. If the sub-expression was determined to be set by system policy, the sub-expression is expanded using the content mapped to the sub-expression by system policy. If the sub-expression is determined to be a file path, then the sub-expression is expanded using the content of the file associated with the file path. Expanding the sub-expression may include inserting the content into the access control pattern associated with the sub-expression. In some embodiments, the sub-expression content may itself include another sub-expression, in which case an expansion step is performed again. After expanding the sub-expression using mapped content, the process of FIG. 8 ends at step 870.

If the sub-expression is not set by system policy at step 810, the sub-expression is determined to be a privilege. An application list for the privilege is retrieved at step 820. The application list is a list of applications which are allowed to assert the privilege. The applications in the list may include those that have been loaded and added to the list at step 570 of the process of FIG. 5. After accessing the application list for the privilege, the sub-expression privilege is expanded using the application list at step 830. Thus, the privilege in the access control pattern for the requested resource is expanded into a disjunction of operands. The process of FIG. 8 then ends at step 870.

An example expansion and evaluation of a resource access control pattern having a privilege is now discussed. For example, assume a resource has an access control pattern of:

$trusted-auth@Ted+word.microsoft.com, wherein $trusted-auth is a privilege. Assume the access control pattern for the privilege indicates that microsoft.com is a publisher allowed to grant the privilege, and that microsoft.com has granted the privilege to programs "login" and "sshd." The expansion for the privilege is then:

(login.microsoft.com|sshd.microsoft.com), wherein each of the two operands of the disjunction is in the format of application.publisher. The corresponding expansion for the resource access control pattern is then:

(login.microsoft.com|sshd.microsoft.com)@Ted+ word.microsoft.com. If a principal attempting to call the resource has a name of "login.microsoft.comTed+word.microsoft.com," this matches the pattern. In particular, the pattern in can be rewritten as "login.microsoft.com@Ted+ word.microsoft.com|sshd.microsoft.comTed+ word.microsoft.com", and "login.microsoft.com@Ted+ word.microsoft.com" matches the left-hand-side of this disjunction.

In some embodiments, the expansion of the privilege access control pattern may be to all applications in the application list for the privilege or only the applications that are currently running. The application list may be reduced to running applications only based on queries made to an operating system or some other module which has information regarding applications running in the system. In some embodiments, the applications running in the system may be those that are referenced by an extant invocation chain.

Figure 9:
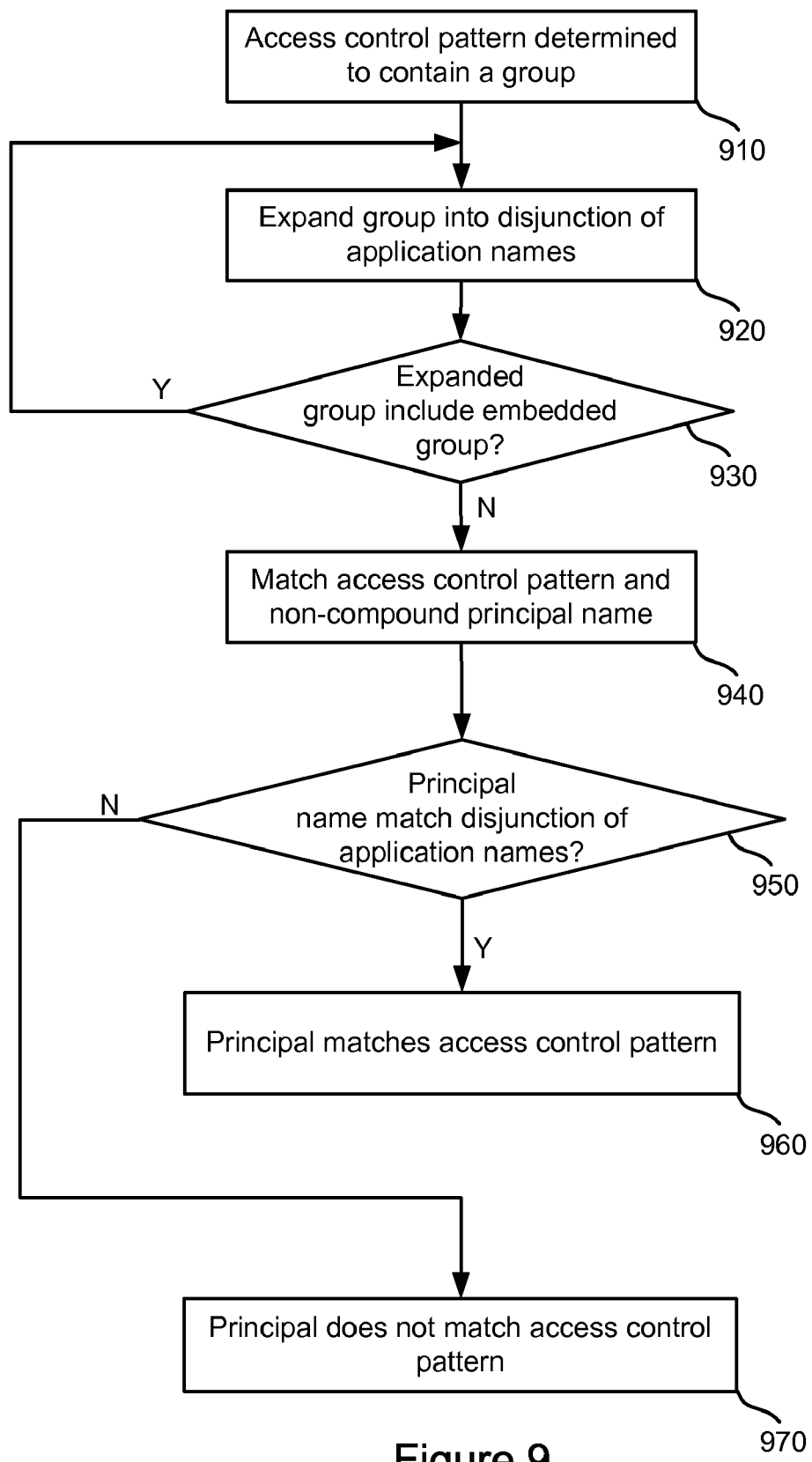
FIG. 9 illustrates a flow chart of an embodiment of a process for determining whether a principal name matches an access control pattern having a group.

In some embodiments, the matching of application names and access control patterns could be implemented using groups rather than privileges. FIG. 9 illustrates a flow chart of an embodiment of a process for determining whether a principal name matches an access control pattern having a group. In some embodiments, the method of FIG. 9 provides more detail for step 660 of the method of FIG. 6. First, the access control pattern is determined to contain a group at step 910. The determination may be made by comparing a detected sub-expression in the pattern to a list of known group names. In some embodiments, regular expressions pattern symbols (such as "*" and "!") would not be used in the grammar for determining access control pattern matching.

The group is expanded into a disjunction of application names at step 920. Expanding the detected group name in the access control pattern may include retrieving content associated with the group name by access permission logic 122 and inserting the group content into the access control pattern in place of the group name. The content may be a disjunction of element names, such as application names comprising an application and a publisher.

After expanding the group name, a determination is made as to whether the expanded group includes an embedded group name at step 930. Thus, the system determines whether the content used to expand the first group name includes another group name. If the expanded group name includes another group name, the process returns to step 920, wherein the new group name is expanded. If the expanded sub-expression does not contain an embedded sub-expression, the method of FIG. 7 continues to step 940.

The access control pattern and non-compound principal name are matched at step 940. Thus, in the case of matching a principal name to an access control pattern having expanded with the content of a group, the principal is a single word entity. Matching of the pattern and principal name may include comparing each disjunction element in an expanded access control pattern and determine if the principal name was an exact match of one such element. Unlike matching against a privilege, a principal name must match an element of an expanded access control pattern exactly.

A determination is made as to whether the access control pattern and principal name match at step 950. If the access control pattern and principal name do not match, a determination is made that the principal name does not match the access control pattern at step 970. The determination is then used in the process of FIG. 6 to determine whether access is granted to the requesting principal. If the access control pattern and principal name do match, the principal is determined to match the access control pattern at step 960.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

We claim:

1. A computer implemented method, comprising:
    generating privilege access lists based on manifests associated with one or more applications and a publisher for each of the one or more applications, said generating including accessing a manifest associated with a first of the applications, identifying one or more privileges in the manifest that the first application is asserted to have, and confirming that a publisher of the first application may grant the privileges in the manifest to the first application;
    receiving a request for a resource from a principal associated with a requesting application;
    retrieving an access control pattern associated with the resource;
    identifying a privilege sub-expression in the access control pattern, the sub-expression defining a privilege;
    accessing the privilege access lists to determine which applications have the privilege in the sub-expression;
    expanding the privilege in the privilege sub-expression in the access control pattern to include the applications that have the privilege; and
    matching the expanded access control pattern to the name of the principal.

2. The computer implemented method of claim 1, wherein the principal is a compound entity.

3. The computer implemented method of claim 1, wherein the disjunction of application names includes applications provided by publishers which are allowed by system policy to grant the privilege associated with the privilege sub-expression.

4. The computer implemented method of claim 3, wherein a publisher that provides an application and an endorser that asserts a privilege for the application are not the same entity.

5. The computer implemented method of claim 1, wherein the principal includes a publisher name and the privilege sub-expression may be expanded to include an application provided by the publisher associated with the publisher name.

6. The computer implemented method of claim 1, wherein said step of matching includes:
    comparing the principal name to the access control pattern expanded using a subset of the application names, the subset limited to names of applications in the disjunction of application names which are running or are otherwise included in a principal name.

7. The computer implemented method of claim 1, further comprising:
    invoking the requesting application; and
    updating the privilege access lists for a privilege asserted by the requesting application if the requesting application publisher has authority to grant the privilege.

8. The computer implemented method of claim 7, wherein said step of updating includes:
    accessing an access control pattern for the privilege;
    determining whether the requesting application publisher matches a publisher in the privilege access control pattern.

9. One or more computer storage devices having processor readable code stored on said computer storage devices, said processor readable code for programming one or more processors to perform a method comprising:
    determining an application asserts at least one privilege, said determining the application asserts a privilege includes accessing a set of program properties from a manifest for the application, and determining if the program properties indicate the application asserts a privilege, the accessing a set of program properties includes either deriving the at least one privilege from annotations or deducing the at least one privilege from analysis of source code;
determining the publisher of the application;
accessing an access control pattern for the privilege;
comparing the application publisher to the access control pattern for the privilege; and
adding the application to an application list for the privilege based on said step of comparing.

10. The one or more computer storage devices of claim 9, wherein the access control pattern for the privilege describes one or more publishers having authority to grant the privilege.

11. The one or computer storage devices of claim 10, wherein the access control pattern is controlled by system policy.

12. The one or more computer storage devices of claim 9, wherein said step of comparing includes:
expanding the access control pattern with one or more publishers by access permission logic.

13. The one or more computer storage devices of claim 9, further comprising:
assuming a new context role by the application.

14. The one or more computer storage devices of claim 9, further comprising:
receiving a request for a resource by a principal comprised of an application;
accessing a second access control pattern for the resource; and
expanding a privilege sub-expression in the second access control pattern with a disjunction of elements included in the application list.

15. The one or more computer storage devices of claim 9, further comprising:
determining if a name of the principal matches the second access control list for the resource after the second access control list is expanded with the application list.

16. The one or more computer storage devices of claim 9, wherein the deducing the at least one privilege from analysis of source code includes determining what resources the application needs access to.

17. A computer system, comprising:
a processor; and
a computer storage media coupled to the processor, the storage media having processor readable code stored thereon for programming the processor to perform a method comprising:
generating application lists comprising a disjunction of application names, wherein said generating application lists includes:
accessing manifests associated with respective applications;
identifying one or more privileges in each of the manifests that the respective application is asserted to have, and
confirming that a publisher of the respective application may grant the privileges in the manifest to the respective application;
receiving a request for a resource from a principal associated with a requesting application;
retrieving an access control pattern associated with the resource;
identifying a sub-expression in the access control pattern;
determining whether the sub-expression is set by system policy and, if so:
retrieving sub-expression content defined by system policy; and
expanding the sub-expression using the sub-expression content defined by system policy;
determining whether the sub-expression is set by privilege and, if so:
accessing the privilege access lists to determine which applications have a privilege in the sub-expression; and
expanding the sub-expression to include the applications that have the privilege; and
matching the expanded access control pattern to the name of the principal associated with the requesting application.

18. The computer system of claim 17, further comprising:
looking for a filename that corresponds to the sub-expression in the access control pattern in response to determining that the sub-expression is neither set by system policy nor by privilege;
selecting file content associated with the filename; and
expanding the sub-expression based on the file content.

19. The computer system of claim 17, wherein said matching includes comparing the principal name to the access control pattern expanded using a subset of the application names, the subset limited to applications which are running or are otherwise included in a principal name.

20. The computer system of claim 17, wherein the identifying one or more privileges in each of the manifests that the respective application is asserted to have includes either deriving the one or more privileges from annotations or deducing the one or more privileges from analysis of source code.

* * * * *